April 24, 1934.    E. W. WEED    1,955,781
LOADING OR HANDLING MECHANISM
Filed May 12, 1932    3 Sheets-Sheet 1
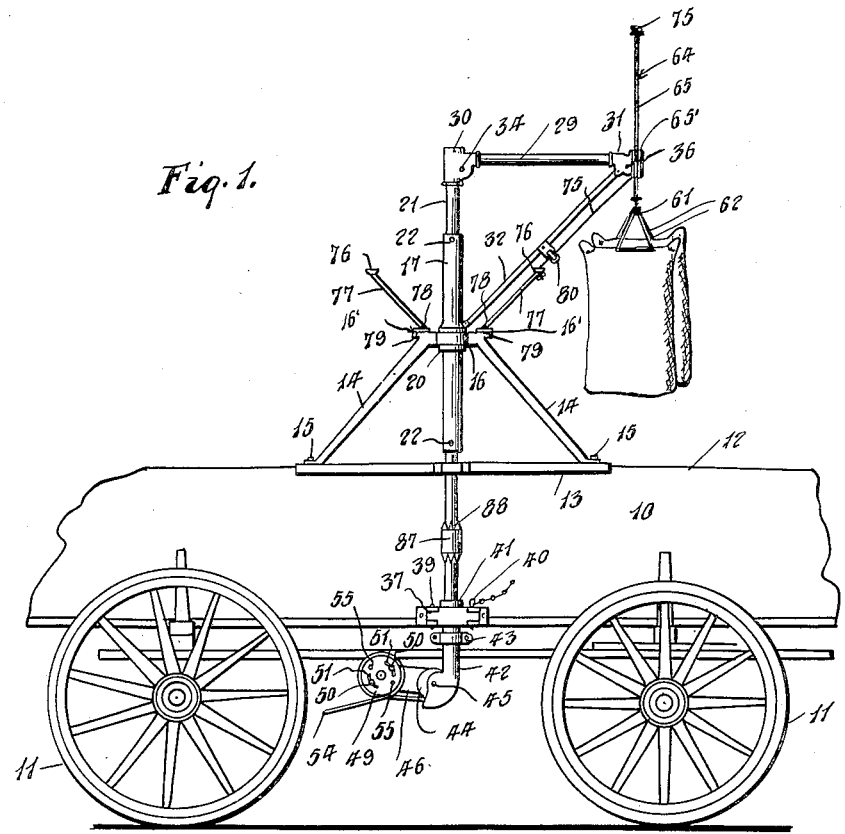
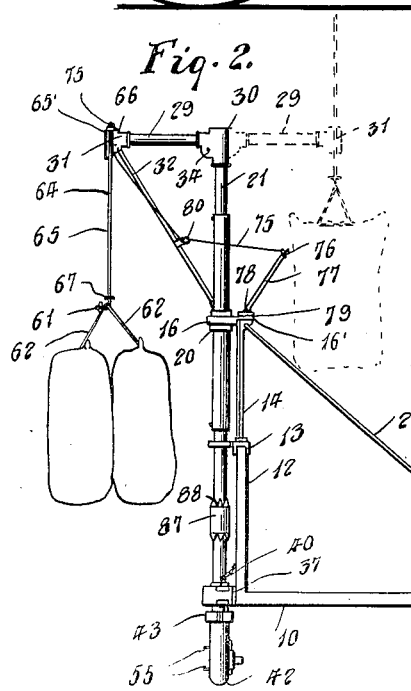
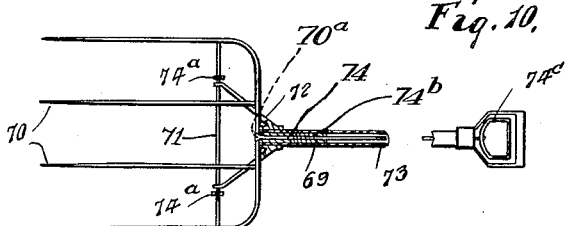
Inventor
E. W. Weed.

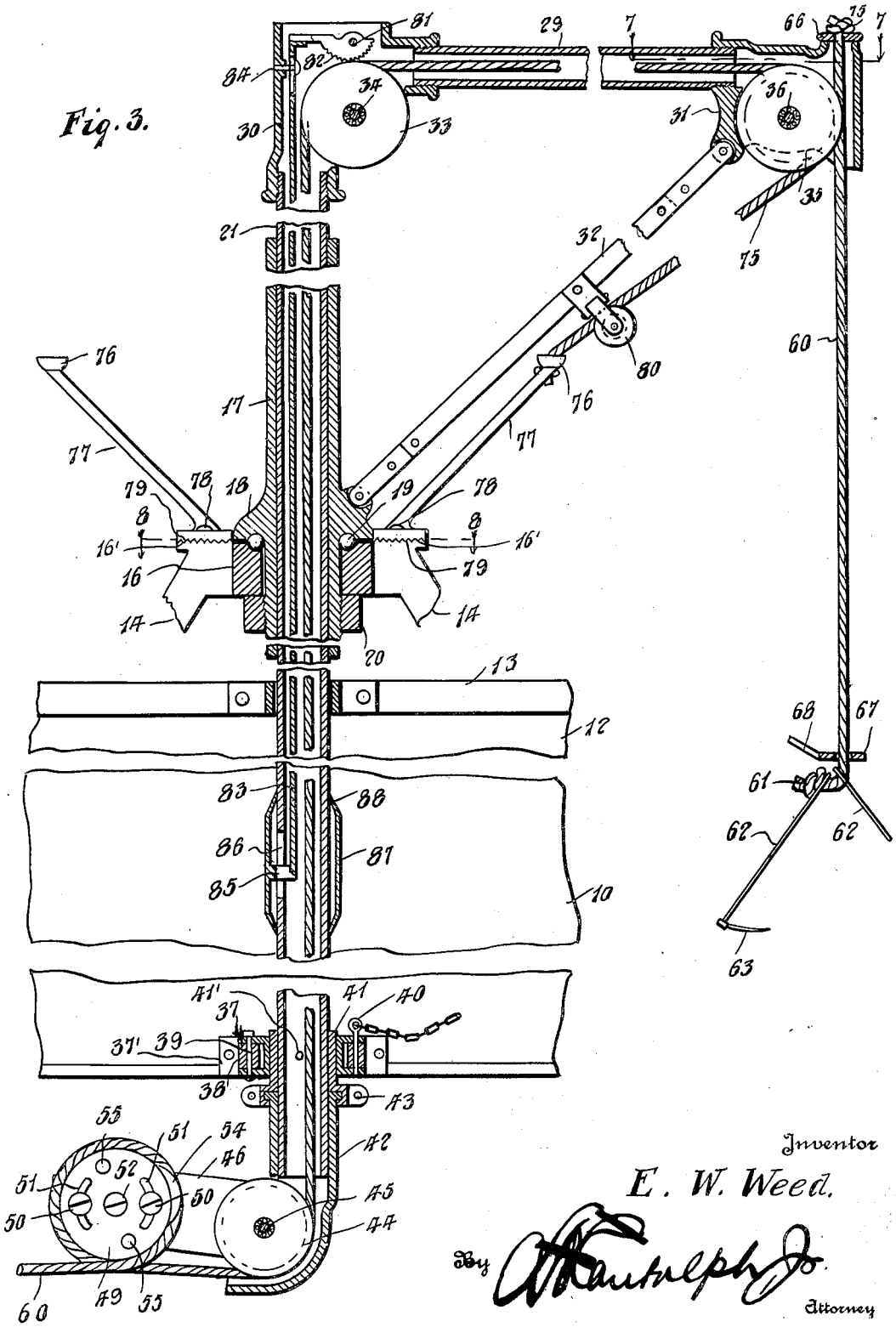

April 24, 1934. E. W. WEED 1,955,781
LOADING OR HANDLING MECHANISM
Filed May 12, 1932 3 Sheets-Sheet 3
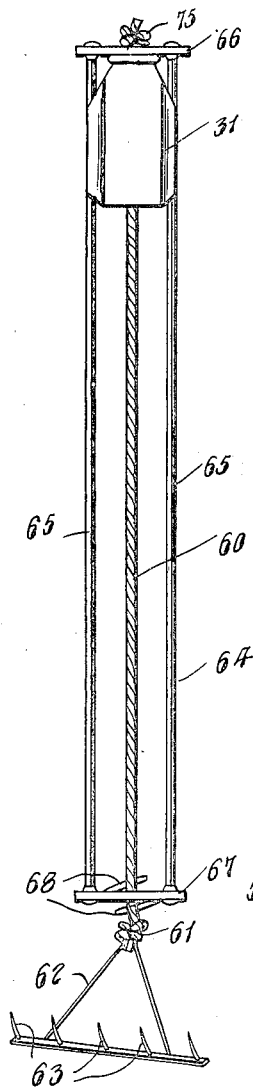
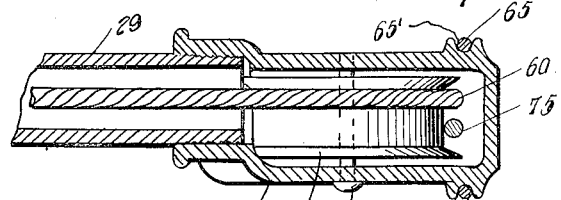
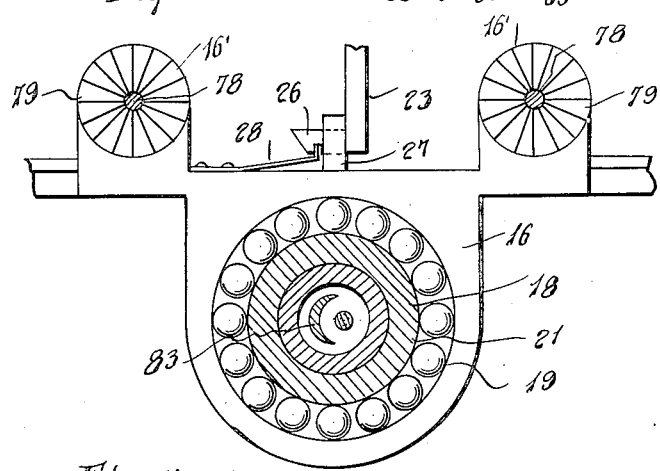
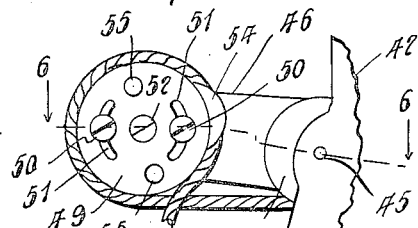
Inventor
E. W. Weed.

Patented Apr. 24, 1934

1,955,781

UNITED STATES PATENT OFFICE 1,955,781

LOADING OR HANDLING MECHANISM

Emil William Weed, Raymond, Alberta, Canada

Application May 12, 1932, Serial No. 610,908
In Canada September 26, 1931

5 Claims. (Cl. 212—51)

This invention relates to a loading or handling mechanism primarily for farm crops to enable the more expeditious lifting, gathering and the like of sacks or crates while traveling over the field and it is primarily in the nature of an attachment for a wagon or other vehicle.

A particular object is to provide novel means operable to swing the arm of the apparatus over the wagon after sacks of material being loaded have reached a sufficient height to allow same to clear the wagon body and the same means also acting to hold the arm from swinging away from the wagon during said lifting operations.

A novel ram or vertically slidable frame for causing the sacks or loads to clear the side of the wagon constitutes an important feature of the invention.

Further, the invention expedites the delivery or lowering of materials from the wagon to the ground into storage cellars, etc.

The invention also provides means to generally enable the more expeditious handling of hay cocks, shocks, bundles and sheaves.

The more specific objects and advantages will become apparent from a consideration of the description following taken in connection with accompanying drawings illustrating an operative embodiment.

In said drawings:—

Figure 1 is a view showing a wagon fragmentarily in side elevation and with my improvements applied thereto, Figure 2 is a fragmentary end view of the wagon equipped with the improvements, Figure 3 is an enlarged view principally showing my improvements in central vertical section, Figure 4 is a detail elevation of the winding drum mechanism, Figure 5 is a plan view of said mechanism, Figure 6 is a sectional view taken on the line 6—6 of Figure 4, Figure 7 is a sectional view taken on the line 7—7 of Figure 3, Figure 8 is a sectional view taken on the line 8—8 of Figure 3, Figure 9 is an elevation of a frame to be used in the handling of sacks and the like, Figure 10 is a plan view of a fork which may be used in the handling of fibrous matter, and Figure 11 is a fragmentary side elevation of said fork.

Referring specifically to the drawings, the invention is shown by way of example in connection with the box 10 of a conventional wagon 11. Resting on the upper edge of one side wall 12 of said wagon box is a bar 13 which supports an inverted U-shape bearing bracket 14, such members 13 and 14 being secured together as by bolts or the like at 15.

Element 14 has a central bearing at 16 in which a sleeve 17 is journaled, the same having a flange 18 overlapping the bearing 16 and anti-friction bearings 19 preferably being interposed. A nut 20 is threaded to the sleeve 17 below the bearing 16.

Disposed within the sleeve 17 is a tubular post 21 which may be adjusted to any desired elevation according to the size of the wagon or disposition of the parts and secured rigidly to the sleeve for turning therewith by means of set screws at 22.

To effectively brace the structure, a detachable rod is provided at 23 having a head 24 detachably applicable in an opening in a bracket 25 fastened to the floor of the wagon box 10. The other end of brace rod 23 has a lug 26 which extends through an opening in a lug 27 on the bearing 16 and which when so engaged interfits with a spring 28 serving to secure the same against accidental detachment.

Post 21 has a horizontal arm 29 secured thereto by means of a coupling at 30. Arm 29 has a terminal bracket at 31 and an adjustable brace 32 is connected to the latter and to the flange 18. A pulley 33 is journaled on a shaft 34 on the coupling 30 and a pulley 35 is journaled on a shaft 36 on the bracket 31.

At the lower end of the side wall 12, a clamp or bearing is provided at 37 having a section 37' fastened to said wall and another section 38 pivoted to the fixed section at 39 and held against accidental opening by a removable pin at 40. Rotatable in section 38 is a bearing sleeve 41 pinned at 41' to the post 21. Bearing sleeve 41 is sectional so that a bracket 42 may be detachably connected thereto at 43. Bracket 42 has bearings for post 21. Bracket 42 has a pulley 44 thereon pivoted to a shaft 45. An extension 46 on the bracket 42 has a boss 47 on which a pulley section 48 is journaled. A coacting pulley section 49 is fastened to the section 48 by means of bolts 50 and elongated slots 51, whereby the section 49 may move slightly relatively to the section 48.

Disk or section 49 is pivoted to a bolt 52 fastened to the projection 47. As best shown in Figure 5, the sections 48 and 49, respectively have rigid gripping jaws at 53 and 54. Spaced lugs 55 may be provided on the section or disk 49 to enable operation thereof through the medium of an interposed rod or equivalent means as suggested at 56'. One end of rod 56' has a hook 56ᵃ whereby it may be suspended from the side of the wagon body when not in use. Pulley section 48 has ratchet teeth at 56 with which a spring pressed pawl 57 coacts in the usual manner to prevent retrograde rotation.

A rope or cable 60 is trained over the pulleys 35, 33, and 44 and is wound over the pulley 48—49 with the terminal of the cable passing between the drum jaws 53 and 54 as shown in Figure 5, such cable passing through the tubular parts of the device as shown and the operation of the drum and cable being hereinafter specifically set forth. The free end of the cable has a knot at 61 whereby it may be attached to various means or elements according to the material or articles to be loaded or handled. For instance bails 62 may be suspended removably thereon, the same having tines at 63 whereby they may engage sacks, bags, boxes or any other suitable article or material.

A vertically slidable ram or frame is used as is shown in Figure 9 at 64, the same having side rods 65 connected by upper and lower cross heads 66 and 67, respectively. Cross head 66 may straddle the bracket 31 with rods 65 removably disposed in grooves 65' of said bracket, as shown in Figure 7 and the rope 60 may pass between separated tines or an opening 68 on such cross head 67. Rods 65 are resilient so that they may be sprung apart to engage or disengage grooves 65'. The frame 64 is raised as the rope 60 is pulled thus enabling the materials lifted to be swung above the sides of the wagon body and across the same as later explained.

In lieu of the bails 62 and with or without the frame 64, forks as shown in Figures 10 and 11 at 69 may be substituted according to the material being handled. The specific fork forms no part of the invention however, it preferably consists of a tine section 70 pivoted on a rod 71 to a holding section 72. A tubular handle 73 projects from the holding section and has a latch bolt mechanism at 74 that engages in an opening 70ᵃ in the tine section 70 and normally holding the section 70 against pivotal movement and thus rigid with the section 72 as shown in Figures 10 and 11. The latch bolt 74 is extended through the handle and has a hand loop 74ᶜ to withdraw it, 74ᵇ designating an expansible coil spring normally holding the bolt in latching position. When the fork is loaded, and thrust over the side of the wagon, the mechanism 74 may be operated to release the section 70 so that it will swing on the pivot 71 and enable the load to drop therefrom. Obviously the cable 60 may be attached in any suitable way to the fork, for instance by the knot 61 engaging a hook 73 which in turn detachably engages a bail 74ᵃ that is attached to the pivot rod 71, 74 on the fork.

A swing rope to cause arm 29 to swing the lifted material across the sides of the wagon is provided at 75, being connected to the cross bar 66 and engageable with the forked upper ends 76 of arms 77, adjustably secured by bolts 78 to the bracket 16 at extensions 16', interengaging teeth being provided at 79 between the surfaces. Cable 75 passes over a pulley 80 suitably carried by the brace 32. It will be realized that the rope 75 may be secured detachably in either arm 77 according to the position at which it is desired to hold the post and parts and swing the arm 29.

It will be apparent that as there is as shown in Figure 1, an arm 77 on either side of the post 21, the load lifted by the cable 60 may be swung to either side of the post by securing the end of rope 75 in forked upper end 76 of the arm on that side of the post towards which the load is to be swung, and when the load is lifted so that cross head 67 and frame 64 is raised thereby the pull on rope 75 by being engaged with cross head 66 will pull the arm 29 around in the direction of the arm 77 engaged by the rope end, so the load may be conveniently deposited in the wagon or truck. The initial position of the arm and lifting members is shown in full lines in Figure 2, the final position in dotted lines in the same figure.

As a result of the construction described, with a rod or lever applied as at 56', and turned, the disk 49 will move relatively to pulley 48, thus clamping the cable 60 between the jaws 53 and 54, whereupon the cable 60 will be wound elevating the load and raising the frame 64 therewith and through the action of cable 75 causing the arm 29 to be moved laterally according to the position for discharge or release of the load. When desired one or more loops of cable 60 may be left around drum 48—49 so that by a slight pull thereon any weight can be controlled and lowered quickly into the wagon, to the ground, storage cellar, basement or the like, because the heavier the load the greater will be the frictional engagement of the cable with the drum. In order to prevent slippage of the cable 60 and to hold the same in different positions, a gripping element is provided at 81 having teeth 82 directly engageable with the cable 60. Element 81 is carried by a slidable operating rod 83 located in the post 21, the same being guided by a pin and slot connection as at 84. Rod 83 has a lug 85 extending through a slot 86 in the post 21 and connected to a sleeve 87 slidable on the exterior of such post and having terminal spring fingers 88 frictionally engaging the same, so as to hold the gripping member 81 in a free position when desired.

It will be obvious that the device may be readily disassembled or lifted off when not in use by removing the brace 23, lifting pin 40, swinging bracket 38 open on pivot 39. Thereafter the bracket is closed and pin 40 replaced until the device is to be again used.

Various changes may be resorted to provided they fall within the spirit and scope of the invention.

I claim as my invention:—

1. A handling mechanism of the class described comprising a support, a sleeve journaled in said support, a flange and nut on the sleeve securing it operatively with respect to the support, a post adjustably mounted within the sleeve, cable and pulley mechanism operatively carried by and associated with said post, a gripping member engageable with the cable, a slidable rod carrying the gripping member, a sleeve slidable on the exterior of the post and connected to the rod, and spring means on the sleeve frictionally engaging the post to hold the rod and gripping member in release position.

2. A handling mechanism of the class described comprising a support, a sleeve journaled in said support, a flange and nut on the sleeve securing it operatively with respect to the support, a post adjustably mounted within the sleeve, cable and pulley mechanism operatively carried by and associated with said post, an arm extending from the post, a bracket at the free end of the arm, a pulley carried by the bracket over which the cable passes, a brace from said bracket to said sleeve, anchoring arms on said support arranged on opposite sides of the post and sleeve, and a swinging cable extending from the bracket and selectively engageable with said anchoring arms.

3. A handling mechanism of the class described comprising a support, a sleeve journaled in said support, a flange and nut on the sleeve securing it operatively with respect to the support, a post adjustably mounted within the sleeve, cable and pulley mechanism operatively carried by and associated with said post, a clamp in separable sections, a sleeve carried by the sections constituting a bearing for the post, a bracket suspended by said sleeve, a pulley on said bracket on which the cable is trained, an extension on said bracket, and a winding means for the cable mounted on said extension.

4. A handling mechanism of the class described comprising a support, a sleeve journaled in said support, a flange and nut on the sleeve securing it operatively with respect to the support, a post adjustably mounted within the sleeve, cable and pulley mechanism operatively carried by and associated with said post, a clamp in separable sections, a sleeve carried by the sections constituting a bearing for the post, a bracket suspended by said sleeve, a pulley on said bracket on which the cable is trained, a winding means on said bracket for the cable comprising a drum, said drum being in relatively movable sections, and cable clamp means carried by the sections for engagement with the cable through relative movement.

5. A handling mechanism having a laterally swingable arm, means to support said arm, a frame vertically movable with respect to the arm, a lifting element carried by the arm and movable through the frame, said element in its travel engaging the frame to raise it as a load carried by the element is lifted, a flexible element secured to the frame and movable therewith, arms secured to the first mentioned support and selectively engageable by said flexible element to swing the arm when the element is moved by the operation of the frame.

EMIL WILLIAM WEED.